Aug. 17, 1965  S. MEURER  3,200,795
METHOD AND APPARATUS FOR FORMING COMBUSTION
GAS MIXTURES FOR ROTARY PISTON ENGINES
Original Filed April 21, 1961  3 Sheets-Sheet 1

Inventor
Siegfried Meurer
By
Bailey, Stephens & Huettig
Attorneys

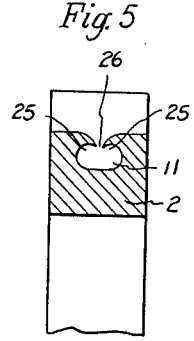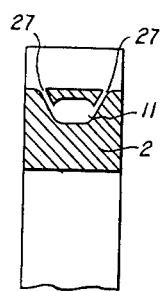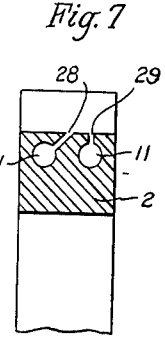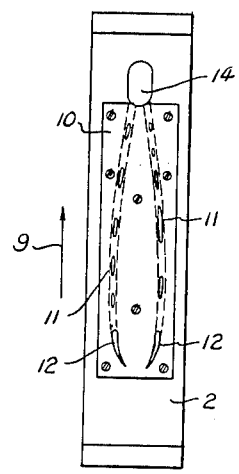

United States Patent Office 3,200,795
Patented Aug. 17, 1965

3,200,795
METHOD AND APPARATUS FOR FORMING COMBUSTION GAS MIXTURES FOR ROTARY PISTON ENGINES
Siegfried Meurer, Nurnberg, Germany, assignor to Maschinenfabrik Augsburg-Nurnberg A.G., Nurnberg, Germany
Original application Apr. 21, 1961, Ser. No. 104,621, now Patent No. 3,144,006, dated Aug. 11, 1964. Divided and this application Mar. 11, 1964, Ser. No. 375,991
Claims priority, application Germany, Apr. 30, 1960, M 45,163
6 Claims. (Cl. 123—8)

This application is a division of application Serial Number 104,621, filed April 21, 1961, now granted as U.S. Patent No. 3,144,006, dated August 11, 1964.

This invention relates to rotary piston internal combustion engines and, in particular, to the formation of the combustion gas mixture for such engines.

This invention is further directed to the compression of the fuel and air mixture and its combustion in rotary or turning piston engines in such a way that the most favorable thermal conditions are produced. In this case, the peculiarities of a rotary piston engine must be taken into account as it is not possible, for example, to raise the compression ratio at will without affecting other important structural dimensions such as those that influence the volume of gas and the engine size. It is especially desirable to keep the maximum gas pressure as low as possible in order to keep the bearing pressures within reasonable values with respect to the large piston surface and the working volume. In order to improve the effective thermal conditions, it is necessary on one hand to raise the compression ratio, while on the other hand to control the engine performance in an even number of turns so that with partial loading the excess of air increases and the mixture ratio becomes leaner, as compared to the Otto-method in which the mixture ratio remains constant or varies only within narrow limits so that it does not fall outside the ignition limit of the combustion gas.

It is known to use the latter kind of solutions as variations in the loading of reciprocating engines. Their effect for the consumption of a partial loading is present in every compression ratio whether high or low. The best consumptions are achieved theoretically between compression ratios which almost correspond to those of fast running reciprocating piston diesel engines. However, in rotary piston engines, one is often interested, for constructural reasons, to not use a compression ratio that is too high and therefor, under certain conditions, dispense with self-ignition without having to give up the advantage of regulating the quality of the combustion gas mixture.

From the manner of forming the combustion gas mixture and the method of burning the mixture in reciprocating piston diesel engines, it is known that it is difficult to guarantee the obtaining of a complete combustion in which, at first and after the beginning of the ignition, releases only small quantities of heat together with a low speed in the rise of the gas pressure, while the quantity of heat which is released is raised up to the maximum with each degree of crank shaft rotation to the end of the combustion of the gases and completion of the expansion. Such a combustion, however, is necessary in order to meet the constructional peculiarities of a rotary piston engine. Such is accomplished by this invention. This has been done with the object of avoiding spontaneous self-ignition reactions which are created by the injection of atomized liquid fuel into hot compressed air and to obtain a gradual mixture of the vaporized fuel with the combustion air. It has been found that, to get a rapid vaporization of the fuel, combustion chamber surfaces whose temperatures are suited to the peculiarity of the fuel being used are most desirable. The most favorable temperature for a fuel corresponds to a molecular composition of $C_{16}H_{34}$ is 340° C. Temperatures of this order can be produced on the surface of a piston in a rotary piston engine.

According to this invention, the piston is provided with a porous or perforated surface which is sprayed with fuel on its side directed away from the combustion chamber or the piston cylinder space. The fuel is distributed under the force of the peripheral acceleration of the rotating piston and on the other hand under the centrifugal forces which are created by the rotating piston and which have the tendency to fling the liquid fuel outwardly in the direction of the piston cylinder space. The porous surface serves to hold the liquid fuel against the centrifugal forces and to ensure that only the vapors formed in the hot surface by reason of the large surface area of the perforations reach outwardly of the piston. Furthermore, since two combustion chambers are created during the rotation of the rotary piston, of which the one leading in the rotation increases in volume from zero to maximum while the one trailing in rotation decreases from maximum to zero, and since both chambers are separated from each other by the constriction or saddle point of the trochoid shape of the piston space, there is created a strong air flow at the point of constriction when changing over from one combustion chamber to the other, and the air flow must use the perforations in the porous surface because of the lack of any other connecting channels between the two partial combustion chambers, and when the air passes through this porous surface, an intensive vaporization of the fuel and mixing with the air takes place which is continued with the rotation of the piston beyond that local point. The porous surface in this sense forms a very effective surface vaporizer which is built into the piston and which effects the necessary vaporization and mixing of the fuel. For the successful cold starting of an engine, it is expedient to use a source of ignition for the combustion gas and so a further reduction in the compression ratio may be used. Such source of ignition is either in the form of an electric spark or a hot point, the effectiveness of which can be increased by catalytic means.

The porous surface for enhancing the combustion of the gas is a porous plate composed of a coarse porous material. When using chromoxide or a coating of chromoxide over a body of ceramic material or when other effective metallic materials are used for the porous plate, the reaction process is advantageously influenced with regard to the reaction product as well as the speed of reaction to achieve a high degree of combustion with little waste.

The means by which the objects of the invention are obtained are described with respect to the following drawings which are directed to a two-thirds rotary piston engine, but the principles of which can be applied by analogy to other rotary or turning piston engine constructed in the manner of a trochoid.

FIGURE 5 is a transverse cross-sectional view of a portion of the piston;

FIGURES 6 and 7 are similar views of two respective modifications of FIGURE 5; and FIGURE 8 is a plan view of a piston according to this invention.

Figure 1:
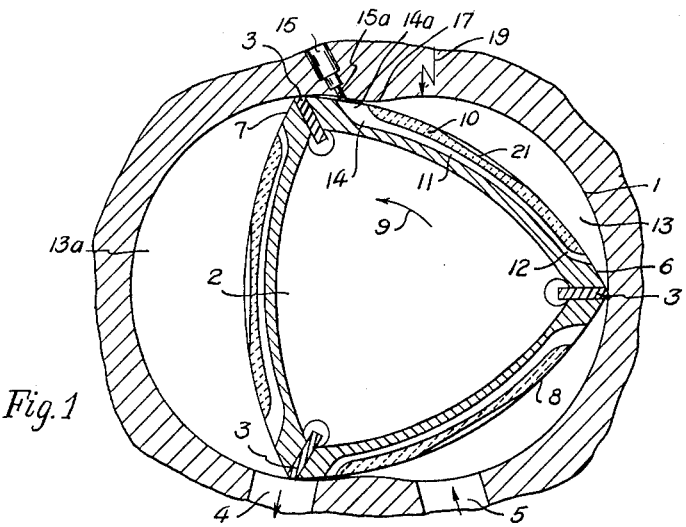
FIGURE 1 is a cross-sectional view through a two-thirds rotary piston engine and showing the section through the porous plates inserted in the surface of the piston.

As shown in FIGURE 1, the cylinder housing 1 has a trochoid shaped piston cylinder space within which piston 2 is rotatably mounted. Exhaust gas port 4 and intake air port 5 communicate with the cylinder space. Piston 2 has three piston head surfaces 6, 7 and 8 which face the cylinder space, with the piston rotating in the direction of the arrow 9. According to this invention, porous piston head surfaces are formed by means of plates 10 inserted in each piston head surface with a channel 11 being formed between the plate 10 and the body of the piston 2. Channel 11 can increase in size from its trailing end 12 opening into compression chamber 13 toward its leading end 14 which opens through the piston head to receive fuel from the injection nozzle 15. Preferably, the fuel is injected as a solid jet of fuel. The trochoid shaped piston cylinder space is narrowed at its constriction or saddle point 17 which constitutes a sealing means.

Figure 2:
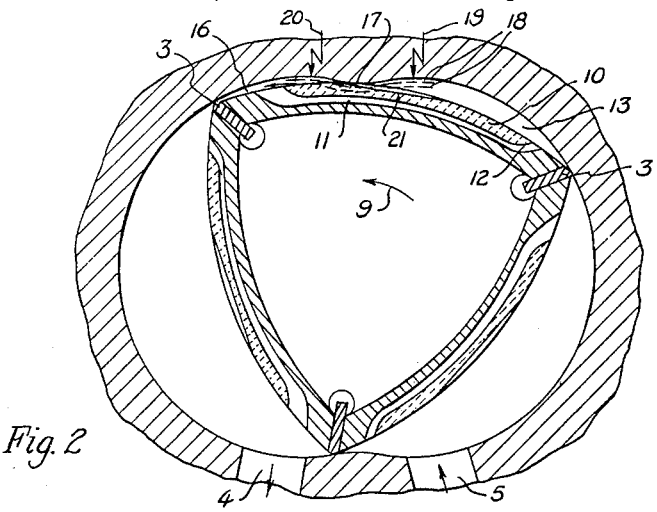
FIGURE 2 is a similar view showing the piston turned to another position.

In FIGURE 2, the leading partial combustion chamber 16 is formed when the piston of FIGURE 1 is rotated counterclockwise. An air flow shown by the arrows 18 is created between chamber 13 and chamber 16. The spark plug or hot point ignition means are indicated by the arrows 19 or 20. The surface of the piston has a slightly flattened portion 21 in the plate 10 for clearing the constriction 17.

Figure 3:
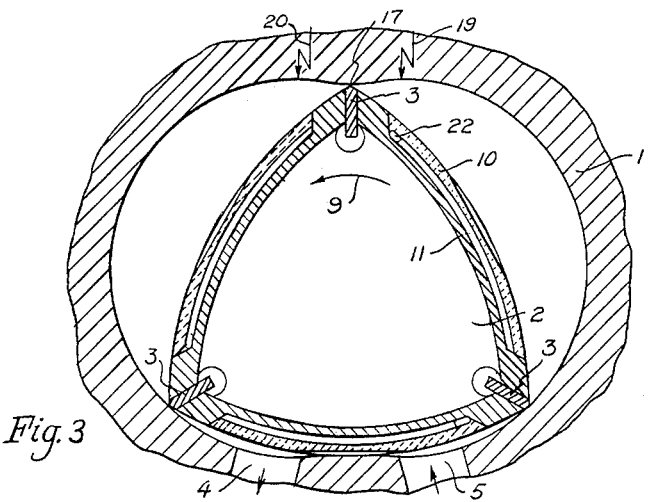
FIGURE 3 is a similar view of a modified form of the invention.

As shown in FIGURE 3, the channel 11 of piston 2 is provided with a port 22 forming an opening through the side of the channel for the introduction of the liquid fuel, this opening being below the outer surface of the plate 10.

Figure 4:
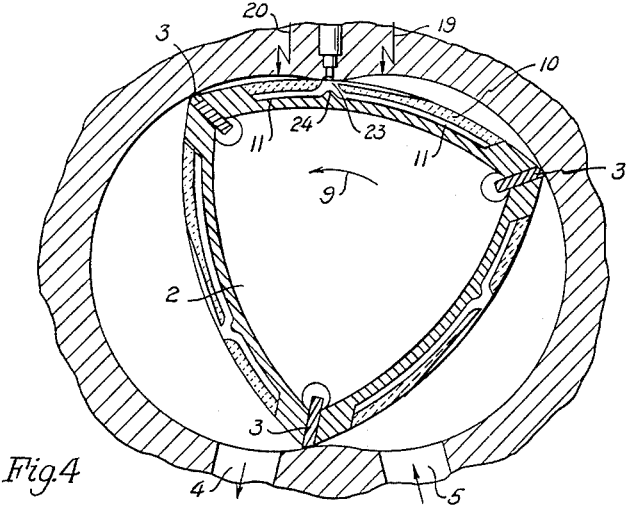
FIGURE 4 is a similar view of a further modified form of the invention.

In the modification of FIGURE 4, the fuel inlet port 23 extends intermediate the leading and trailing ends of plate 10, the fuel being deposited through port 23 onto a deflecting protuberance 24. FIGURE 5 shows the channel 11 in piston 2 having a kidney shape which forms side sub-chambers 25 and the opening 26 into the outside of the piston.

FIGURE 6 is a modification of FIGURE 5 in which the channel is opened exteriorly of the piston through openings 27 and in the modification of FIGURE 7 each of the two channels 11 is provided with openings 28 and 29, respectively. In FIGURE 8, the plate 10 is shown mounted in a cavity formed in the surface of the piston body.

Fuel nozzles for the injection of fuel into a diesel engine ordinarily have the nozzle bore and the nozzle needle arranged within the body of the nozzle. In this invention, in order to be in accord with the peculiarities of a rotating piston engine, the ordinary construction is modified. In this invention, note FIGURE 1, the bore 15a for the injection nozzle is drilled directly through the housing 1 to form the opening into the cylinder space. The nozzle needle for the injection nozzle is mounted in the bore 15a either without any further attachment or, as heretofore, is mounted in a separate nozzle body. This construction has the advantage that the sliding of the sealing strip 3 in the apex of the piston over the bore 15a can take place smoothly and without being deviated by a nozzle body screwed in the housing from the outside.

When the wall of the cylinder contains bores or indentations, the risk exists that, at the moment the sealing strip passes over such bores or indentations, the working gases in the cylinder which are under different pressures on the leading and trailing sides of the sealing strip create strong air currents which lead to the injury of the sealing strip or to difficulties with the bores or indentations. The difference in pressure on opposite sides of the sealing strip is equal to zero or approximately zero when the rotating piston is in certain positions and according to the compression of the working phase in adajacent chambers. Such a piston position is shown approximately in FIGURE 1 in which the chamber 13 is in the state of compression while the chamber 13a is being emptied due to the opening of exhaust port 4. In this phase, the pressure difference at the sealing strip 3 is zero. Consequently, it is understandable that this is the most favorable moment for the sealing strip 3 to pass over a bore or indentation in the wall of the cylinder since at this moment there is no gas motion.

The function of the apparatus of this invention for the forming of a combustion gas mixture is as follows:

In FIGURE 1, when the piston moves in the counterclockwise direction of arrow 9, the air in chamber 13 is being increasingly compressed. The velocity of the sealing strip at this moment is still close to its minimum. When the opening 14a of channel 11 reaches the range of the bore 15a, injection of fuel from the nozzle 15 begins and the fuel moves through the length of channel 11. The solid liquid fuel is injected in the same manner as used in the injection of fuel into reciprocating diesel or Otto engines. The form of the jet and the injection pressure are as required by the particular engine. Because of the velocity of the injected fuel caused by the injection pressure, the fuel tends to run through channel 11 toward the trailing end opening 12. Since the piston turns in the direction of arrow 9, the movement of the fuel toward opening 12 is assisted by the rotation of the piston. Further distribution of the fuel is successfully accomplished by fully using the intertia of the fuel, by reason of which the fuel injection through nozzle 15 is effected with very low pressures and low velocity of fuel injection but with a large cross-sectional area for the jet. By so injecting the fuel, it can be said that in effect the channel 11 is pushed over the injected fuel by the rotation of the piston.

As the piston continues to turn, the fuel takes the velocity of the piston so that it becomes subject to the then applied centrifugal force. Such force drives the fuel through the porous body 10, vaporizes the fuel, and then passes the fuel into the chamber 13. By this means and even with a small radial extension of the wall of the combustion chamber, the fuel is prevented from reaching the cooled wall of the chamber in liquid form.

The further formation of the combustion gas mixture is as follows:

As shown in FIGURE 2, the piston 2 lies immediately before the maximum air compression in chamber 13. Because of the particular trochoid shape of the cylinder space wall, two partial chambers 13 and 16 now exist. A strong air flow is created at the constriction 17 of the trochoid wall since the air is being pushed from chamber 13 which is decreasing in volume into chamber 16 which is increasing in volume. Therefore, the air is forced to flow partially through the porous plate 10 as shown by the arrows 18 so that there is an intensive mixing of the air with the fuel that has been vaporized in the porous plate 10. A part of the fuel is being ejected through the trailing end 12 of channel 11 and due to the centrifugal force is projected from the surface of plate 10 into chamber 13 so that a formation of a gas and fuel mixture also takes place in chamber 13. Burning of the fuel is initiated by the air compression temperature in chamber 13 or by means of another source of ignition 19 so that the movement of the gases through the porous surface 10 and channel 11 continues to increase until combustion begins in chamber 16. Now when a second source of ignition 20 is used whose effect of ignition with regard to time is started before, at the time with, or after that of the ignition source 19, the operation of the gas flow at constriction 17 can be regulated as desired. Upon the further turning of the piston, the porous surface of plate 10 is covered with the combustion mixture forming gas stream along its entire length. The peripheral length between the leading and trailing ends of the surface of plate 10 makes possible a very favorable distribution of the combustion gas mixture in the whole of the elongated combined combustion chambers 13 and 16 and makes it possible to obtain the required slow release of heat as desired. By the flattened portion 21 of the surface of plate 10, the velocities of the air and fuel stream can be varied with regard to time and space and by so doing it is possible to avoid large interior losses due to throttling. The transverse width of the surface of plate 10 in the direction of the axis of the crank shaft can be varied in order to give definite zones of the combustion chamber a supply of more or less fuel. This can be assisted in the shaping of channel 11, especially in its radial and axial directions.

Injection of the fuel can also be accomplished as illustrated in FIGURES 3 and 4.

As shown in FIGURE 3, the fuel is injected into channel 11 adjacent the sealing strip and parallel to the axis of the crank shaft and below the outer surface of plate 10. In the position of piston 2 shown in FIGURE 3, the sealing strip is passing through its minimum peripheral velocity. This moment is preferably used for the introduction of the fuel into channel 11 beneath the the porous plate 10. In so doing, the fuel can be injected into opening 22 with very little pressure and through the side wall of the housing 1 for the piston cylinder. As the piston turns in the direction of the arrow 9, the fuel is distributed along channel 11 and through plate 10 as heretofore described.

In FIGURE 4, the fuel is introduced intermediate the leading and trailing ends of plate 10. The fuel nozzle is mounted in the constriction of the trochoid wall and an opening 23 in plate 10 serves for introducing the oil into channel 11. The fuel entering through opening 23 is distributed into the channel by impingement on deflecting ridge 24.

FIGURE 5 is a modified construction for the distribution of the fuel. This fuel shows a cross-sectional view transversely of the piston and parallel to the crank shaft. The channel 11 is formed in the body of rotary piston 2 and has a cross-section in the shape of a kidney for the purpose of forming a fuel collecting groove such that the fuel has been injected as described for FIGURES 1, 3 and 4 and is distributed through channel 11 by the turning of the piston. The fuel cannot, however, be flung from the groove by centrifugal force as the fuel is contained in the chambers 25. As described for FIGURE 2, the fuel is vaporized and mixed with the compressed air which enters opening 26 with the fuel and oil so mixed then flowing into chambers 13 and 16. In this modification, the openings 26 can be formed as a continuous slit or as a plurality of spaced slits or by means of a number of circular connecting bores.

The distribution of the openings transversely of the piston, that is in the direction of the axis of the crank shaft is accomplished by the slits 27 of FIGURE 6 or by the making of a plurality of channels 11, each of which has its individual openings. According to how the fuel is to be distributed from the piston, the openings from the piston to chambers 13 and 16 are given the form of the ports 28 or 29. The inclined opening 28 is provided when greater amounts of fuel are used and when a later discharge of the fuel is desired, while in the zones in which an early discharge is to take place, the bore 29 is correspondingly used. By these means, it is possible to achieve a distribution of fuel along the periphery of the piston which corresponds to the distribution of the air and the requirements of the fuel-air mixture for the combustion gas with regard to time.

In the drawings, the dimensions of the size of the channels and openings are exaggerated for purposes of clarity. As shown in FIGURE 8, in a practical construction, the rear surface of the plate 10 is provided with ribs which form the channel 11 when the plate is inserted in the piston surface. By using an inserted plate, the degree of the rib contact with the body of the piston can be such so as to keep the temperature of the heat conducting bodies to the values that result in the greatest rapidity of vaporization for the fuels being utilized.

Having now described the means by which the objects of the invention are obtained,

I claim:

1. In a rotary piston engine having an equilateral arc triangular piston mounted for rotation in a trochoid shaped piston cylinder, said piston having a combustion gas forming structure comprising a gas permeable surface area composed of a body containing a plurality of slits on said piston facing into said cylinder, channel means beneath said surface area, and nozzle means for injecting fuel into said channel means for vaporizing the fuel in conjunction with said surface area and forcing the vaporized fuel through said surface area and through said channel means to mix the vaporized fuel and air into the combustion gas.

2. In a rotary piston engine having an equilateral arc triangular piston mounted for rotation in a trochoid shaped piston cylinder, said piston having a combustion gas forming structure comprising at least one channel in said piston extending substantially parallel to and beneath the outer surface of said piston, nozzle means for injecting fuel into said channel for heating and vaporizing fuel in said channel, and opening means of substantially lesser width than said channel, communicating said channel and said cylinder radially outward of said piston surface for conducting compressed air from said cylinder into said channel for mixing with the vaporized fuel and forming the combustion gas.

3. In an engine as in claim 2, said channel having a kidney shaped cross-section, and said opening means being positioned so that fuel under the centrifugal force of a rotating piston is substantially prevented from leaving said channel through said opening means.

4. In an engine as in claim 2, said opening means comprising slits arranged along the length of said channel.

5. In an engine as in claim 2, said opening means further comprising an opening at the trailing end of said channel with respect to the direction of the rotation of said piston.

6. In an engine as in claim 2, said opening means being contained in a plate secured to said piston, and ribs on said plate for forming said channel.

References Cited by the Examiner

UNITED STATES PATENTS 2,907,308    10/59    Meurer et al.           123—32.2
2,947,290    8/60    Froede               123—8

OTHER REFERENCES

Mundy, H.: NSU-Wankel Rotary Expansion Engine, in The Autocar, 112(3341), pp. 342–344, February 26, 1960, TL1–A5.

Scott, D.: Auto Engine Without Pistons, in Popular Science 176(3) pp. 82–86, March 1960, Q1–P8.

Wankel et al.: Bauart und Gegenwartiger Entwicklungsstand Einer Trochoiden-Rotationskolbenmaschine, in MTZ, 21(2), pp. 33–46, February 1960, TJ751–M6.

KARL J. ALBRECHT, *Primary Examiner.*

JOSEPH H. BRANSON, JR., *Examiner.*